United States Patent
Ho

(10) Patent No.: US 7,976,201 B2
(45) Date of Patent: Jul. 12, 2011

(54) LENS BODY EQUIPPED WITH A LIGHT EMITTING DEVICE CAPABLE OF GENERATING TWO-SIDE ILLUMINATION

(76) Inventor: Yen-Wei Ho, Taichung (TW)

( * ) Notice: Subject to any disclaimer, the term of this patent is extended or adjusted under 35 U.S.C. 154(b) by 244 days.

(21) Appl. No.: 12/289,994

(22) Filed: Nov. 10, 2008

(65) Prior Publication Data

US 2010/0073937 A1    Mar. 25, 2010

(30) Foreign Application Priority Data

Sep. 19, 2008  (TW) .............................. 97217024 U

(51) Int. Cl.
*F21V 5/00* (2006.01)
(52) U.S. Cl. ......... 362/338; 362/333; 362/335; 359/743
(58) Field of Classification Search .................. 362/333, 362/335–338; 359/743
See application file for complete search history.

(56) References Cited

U.S. PATENT DOCUMENTS 5,526,190 A * 6/1996 Hubble et al. ................ 359/719
* cited by examiner

*Primary Examiner* — Stephen F Husar
(74) *Attorney, Agent, or Firm* — Raymond Y. Chan; David and Raymond Patent Firm

(57) ABSTRACT

A two-side illuminating lens body mainly projecting light from a light emitting device to two relative outer directions includes a base with a receiving slot having a downwards opening for receiving a lighting device. A concave arc for receiving the light emitting portion of the lighting device is formed above the receiving slot as a light incident side. On a top surface of the base, two symmetrical non-spherical protrusions are jointly arranged beside a center light axis. A concave curved surface is formed to a border of the two non-spherical protrusions. Two symmetrical awl laterals are formed on relative outer edges of the non-spherical protrusions. Through three different refracting types of the concave curved surface, non-spherical protrusions, and awl laterals, rays from the light emitting device will be gradually diffused away from the center light axis so that a double-side skew light distribution of illumination like a butterfly is projected.

9 Claims, 5 Drawing Sheets

LENS BODY EQUIPPED WITH A LIGHT EMITTING DEVICE CAPABLE OF GENERATING TWO-SIDE ILLUMINATION

FIELD OF THE PRESENT INVENTION

The present invention relates to lens body, and particular to lens body equipped with a light emitting device capable of generating two-side illumination by diffusely refracting rays from the light emitting device through at least three different refractions.

DESCRIPTION OF THE PRIOR ART

A prior lens is usually made with a Light Emitting Diode (LED) capsulated inside and with a spherical top for gathering and concentrating the light. However, the light is gathered around the light axis of the source so the light energy is too concentrated. To enlarge the illuminating area, light guiding plate is provided to solve the above problem. To overcome the small illuminating area of the LED, a plurality of LEDs is needed to achieve the uniformity as a flat illuminating source.

Therefore, to efficiently reduce quantity of the LED under the certain area of guiding plate, inventors turn to develop lens for the purpose such as a U.S. Pat. No. 6,679,621. Through a special appearance design, rays emitted from LED will be refracted perpendicular to a light axis by the lens so as to solve the small illuminating problem mention above. However, an illuminating efficiency will be lowered by multiple reflections and refractions of the structure, insufficient energy around the light axis is caused by too much rays being refracted perpendicular to the light axis.

Based on defects and usage of the previous patent, inventors developed a lens body with more uniform projections on two lateral sides and central area such as a patent no. US 2007/0029563 A1 of LIGH-EMITTING DIODE AND VEHICULAR LAMP. A LED is sealed packed on a light axis of a lens body. Two convex curved bodies are formed to the lens body along the light axis. A convex curved edge is formed beside the two convex curved bodies. Rays from LED will be diffusely refracted through the curved surface so that the central area will have a more uniformly projection of light.

However, except the technology of illuminating more wide to later side disclosed in above patents, the inventor of the present invention want to provide an optical lens with better functions.

SUMMARY OF THE PRESENT INVENTION

Accordingly, a primary object of the present invention is to provide a two-side illuminating lens body capable of diffusely refracting rays from a center light axis of the lens body so as to generate two-side illuminating distribution. It can be applied to flat illuminating source and it can reduce the quantity of the illuminating source and lower cost of production.

To achieve above objects, the present invention provides a two-side illuminating lens body with two symmetrical non-spherical protrusions arranged to two sides of a center light axis of the lens body. A concave curved surface is formed to a border of the two non-spherical protrusions. Two symmetrical awl laterals are formed on relative outer edges of the non-spherical protrusions. Rays closed to the center light axis will be diffusely refracted to two sides away the center light axis by the concave curved surface and the rays will be further more diffusely refracted away from the center light axis by the non-spherical protrusions. By a refraction of light perpendicular to the center light axis through the awl laterals, the light emitting device can project uniformly on two lateral sides.

Moreover, a preferable embodiment of the present invention provides a receiving slot having a downwards opening for receiving and positioning a lighting device. A concave arc for receiving the light emitting portion of the lighting device is formed to a top side of the receiving slot as a light incident side so as to perform a first diffusely refraction. A second refraction with greater refracting angle will be performed by above concave curved surface, non-spherical protrusions, and awl laterals which are a light projecting side.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
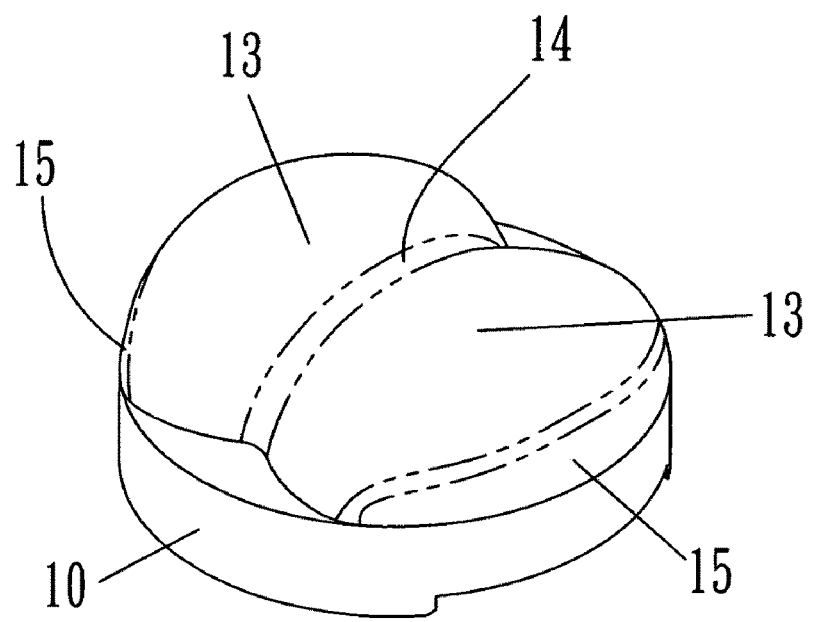
FIG. 1 is a pictorial drawing of a two-side illuminating lens body of the present invention.
Figure 2:
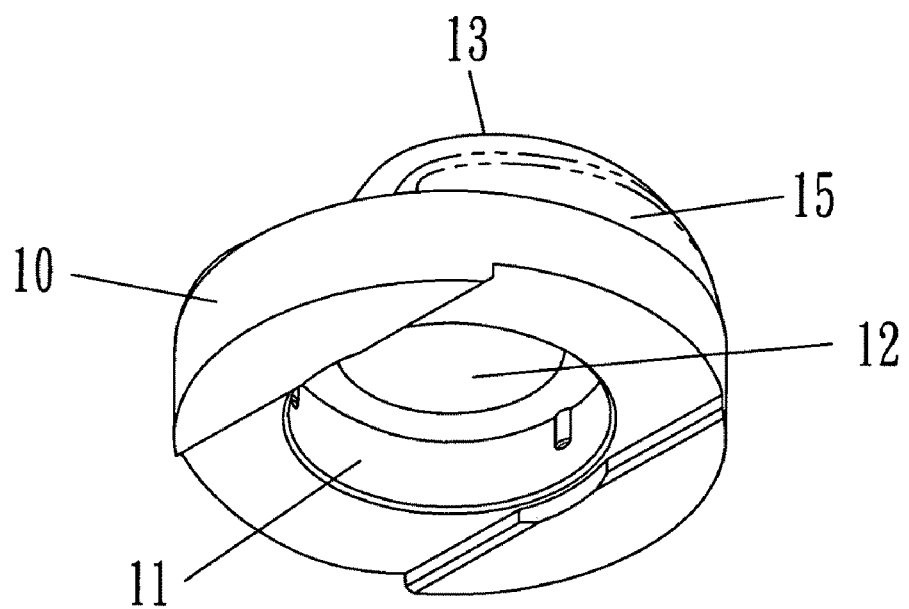
FIG. 2 is a pictorial drawing of a two-side illuminating lens body of the present invention from another angle.
Figure 3:
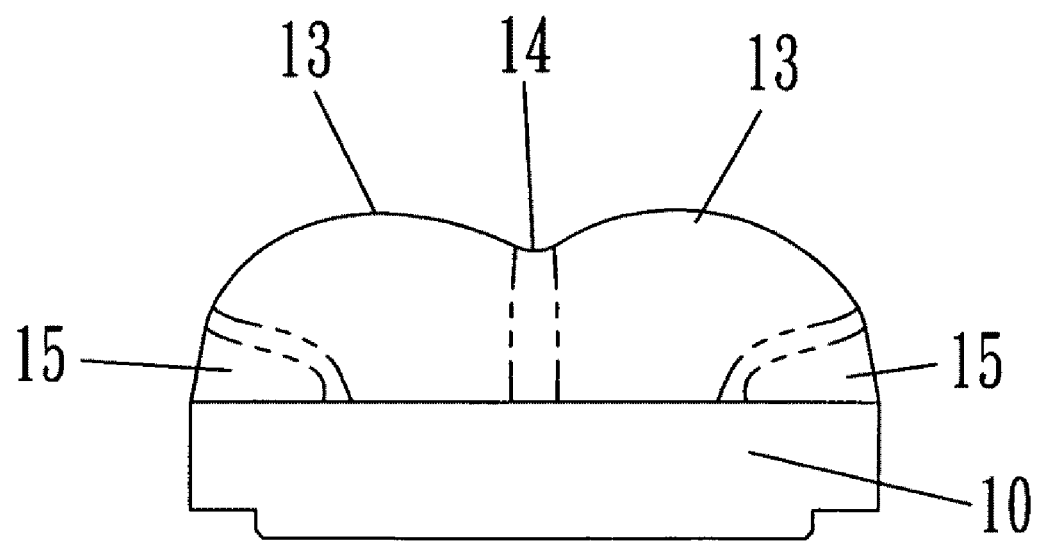
FIG. 3 is a front view of the two-side illuminating lens body of the present invention.
Figure 4:
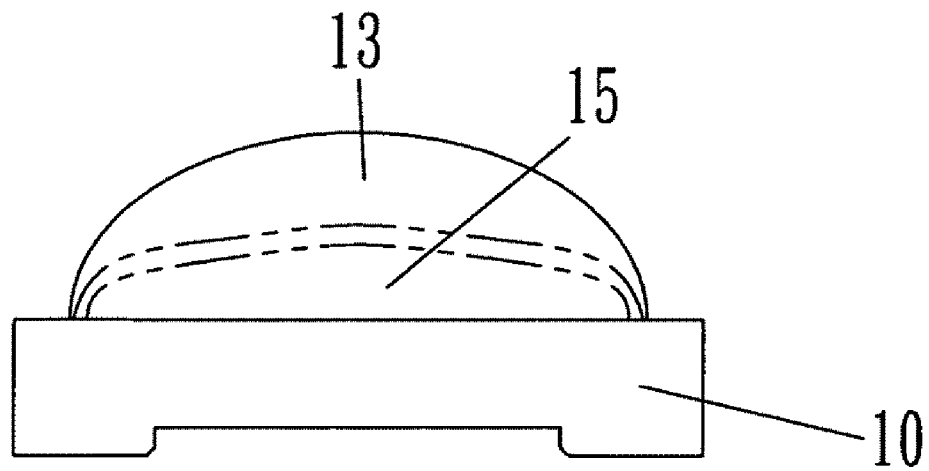
FIG. 4 is a lateral view of the two-side illuminating lens body of the present invention.
Figure 5:
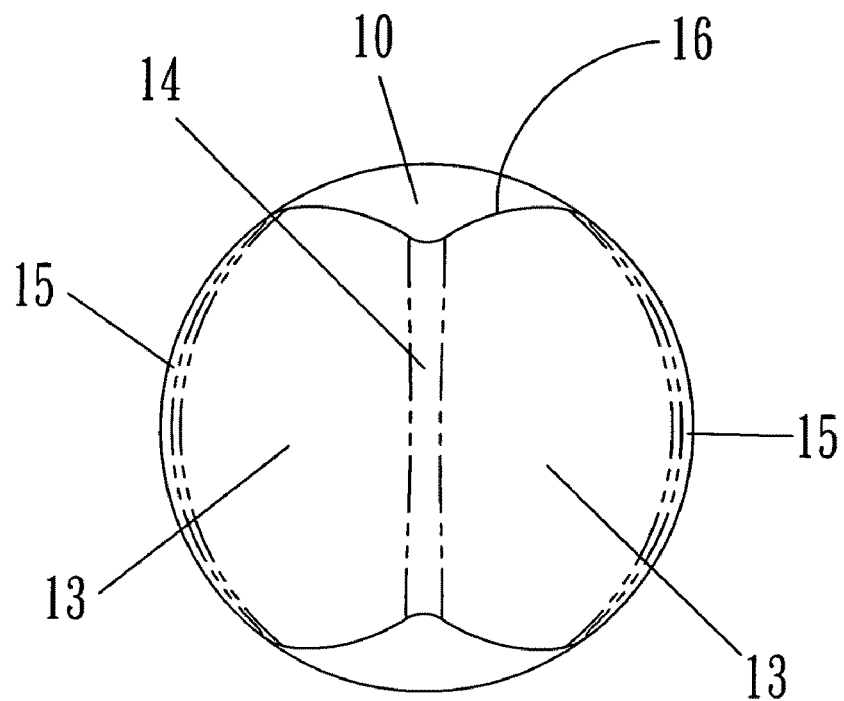
FIG. 5 is a top view of the two-side illuminating lens body of the present invention.
Figure 6:
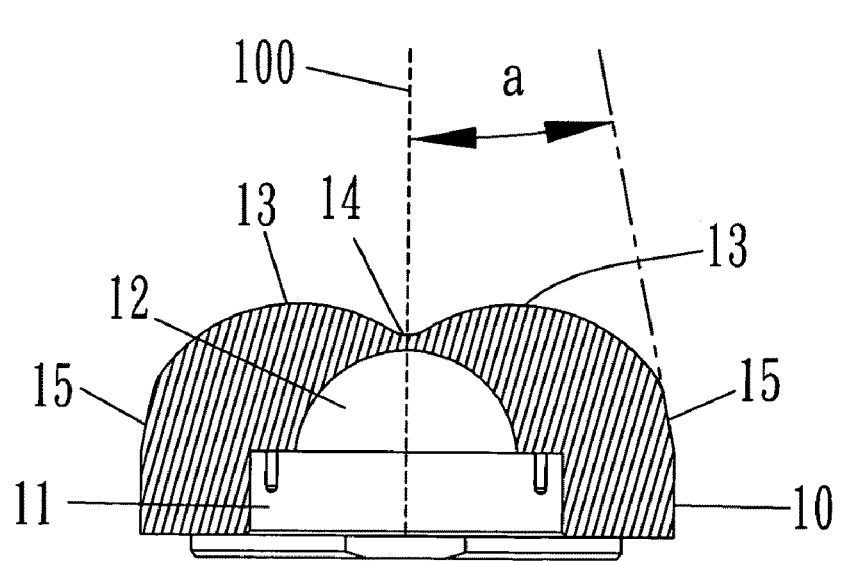
FIG. 6 is a front cross section view of the two-side illuminating lens body of the present invention.
Figure 7:
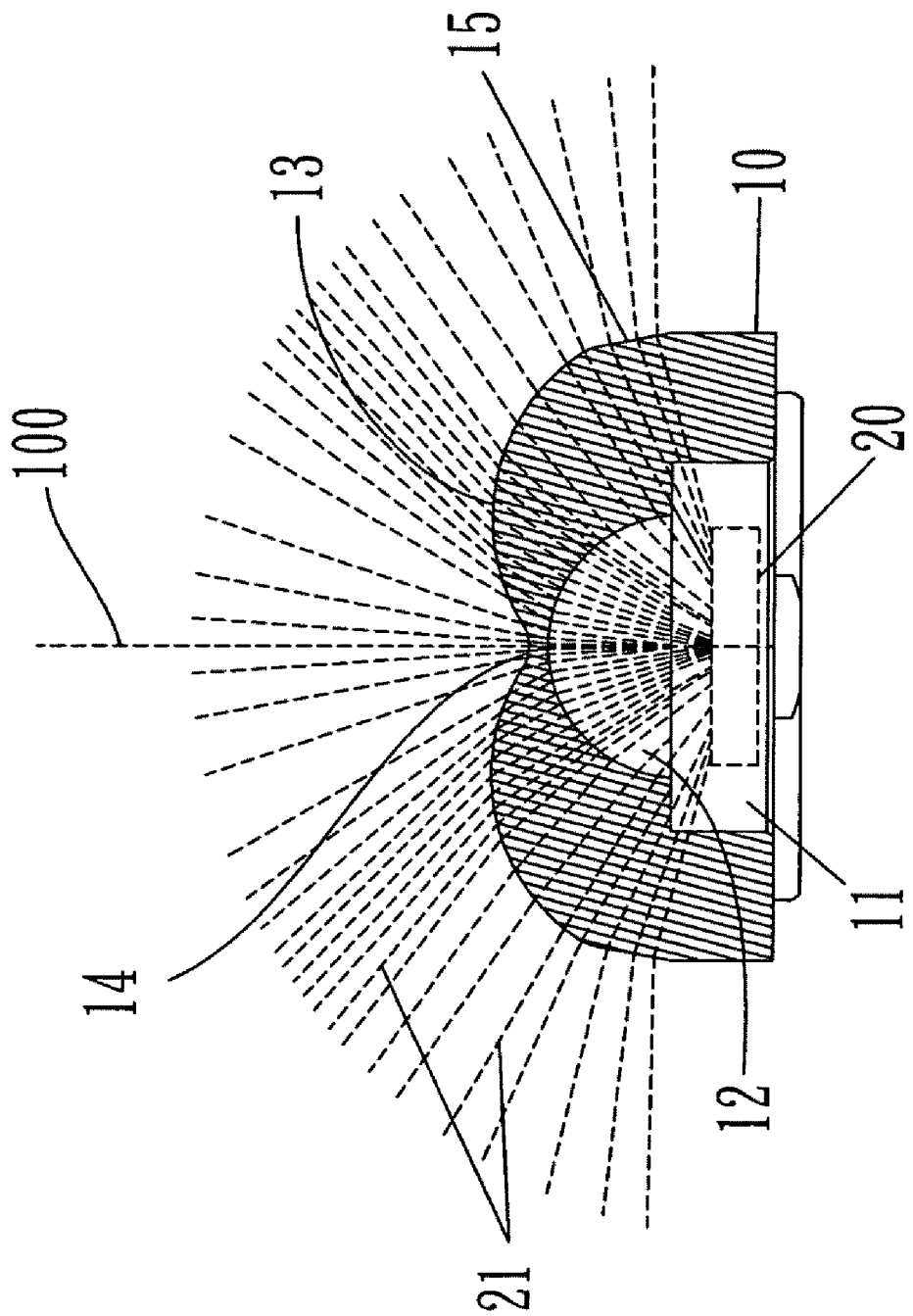
FIG. 7 is a front cross section view of the two-side illuminating lens body of the present invention and a schematic view showing refractions of light.

Firstly, referring to FIGS. 1 to 7, a preferable embodiment of two-side illuminating lens body according to the present invention is illustrated. The lens body includes a highly transparent base 10 with a receiving slot 11 having a downwards opening for receiving and positioning a lighting device 20. A concave arc 12 for receiving the light emitting portion of the lighting device 20A is formed above the receiving slot 11 as a light incident side. On a top surface of the base 10, two symmetrical non-spherical protrusions 13 are arranged with a proper spacing on two sides of a center light axis 100. A concave curved surface 14 is formed to a border of the two non-spherical protrusions 13. Two symmetrical awl laterals 15 are formed on relative outer edges of the non-spherical protrusions 13. A thickness of the concave curved surface 14 is gradually reduced outwards from the center light axis 100. A thickness of the non-spherical protrusion 13 is gradually reduced outwards from a highest point thereof. The top surface of the two-side illuminating lens body is generally like continuous waves from a front view (as shown in FIG. 3), or like a butterfly 16 with spread wings from a top view (as shown in FIG. 5).

Figure 8:
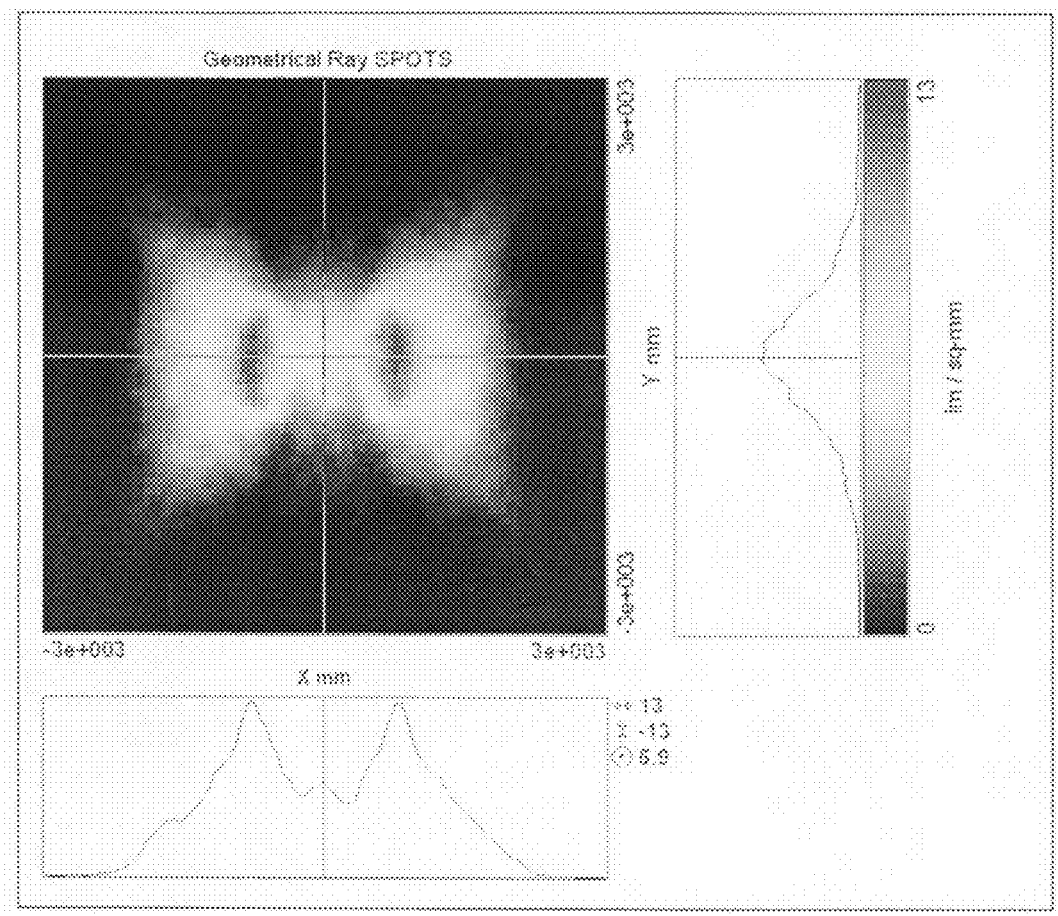
FIG. 8 is simulated illumination distribution of the two-side illuminating lens body of the present invention.

Accordingly, rays 21 emitted from the lighting device 20 will go through the concave arc 12 which is the incident side and be projected from three light projecting sides of concave curved surface 14, non-spherical protrusions 13, awl laterals 15. The design of the three light projecting sides will gradually enlarge refracting angles from the center light axis 100. A light up area like a butterfly 16 (as shown in FIG. 5) and a larger area of high density light (as shown in FIG. 8) are formed. Wherein, the base 10 is a symmetrical cylinder body based on the center light axis 100, and a distribution of light is depend on a distance between the highest point of the non-spherical protrusion 13 to the top surface of the base 10, a distance between the highest point of the non-spherical protrusion 13 to the center light axis 100, and a height difference between the highest point of the non-spherical protrusion 13 to a lowest point of the concave curved surface 14.

In FIG. 8, an illuminating distribution figure showing a projection of light in two directions of the two-side illuminating lens body according to the present invention is plotted. The design of the awl lateral can have a refraction of light perpendicular to the center light axis.

Moreover, the awl laterals 15 on the relative outer sides of the non-spherical protrusions 13 are gradually narrowed along the projecting direction of the center light axis 100, an angle a which is about 10 degrees is between a tangent line of the awl lateral and the center light axis 100. Rays 21 emitted from the light device 20 will be refracted to two outer directions based on the center light axis 100 by the concave arc 12 and go into the non-spherical protrusions 13. The rays 21 will be further diffusely refracted by the non-spherical protrusions 13, concave curved surface 14, and the awl laterals 15. By the awl laterals 15, the second refraction will have the rays 21 covered almost 180 degrees of projecting angle. Wherein, the concave arc 12 is arranged on the center light axis 100, a diameter of an opening of the concave arc 12 is nearly equal to a distance between two centers on surfaces of the non-spherical protrusions 13. The two centers of the non-spherical protrusions 13 are slightly lower than a top of the base 10, and the distance between two centers of the non-spherical protrusions 13 is between the radius and the diameter of the entire non-spherical protrusion 13.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A two-side illuminating lens body, comprising:
   a base having a receiving slot and a downward opening thereof to define a center light axis, wherein said base is for receiving a lighting device through said receiving slot and said downward opening;
   two symmetrical non-spherical protrusions formed on two sides of a center light axis on a top surface of the base;
   a concave arc formed in said receiving slot as an incident side of light ray emitting from said lighting device;
   a concave curved surface extended between said two non-spherical protrusions; and
   two symmetrical laterals extended from outer edges of said non-spherical protrusions respectively, wherein a thickness of said concave curved surface gradually reduces outwardly from said center light axis, wherein a thickness of each of said non-spherical protrusions gradually reduces outwardly from a highest point of said corresponding spherical protrusion with respect to said base, so as to form a continuous wave cross sectional shape of said two-side illuminating lens body, so that that when light ray emitted from said lighting device reaches said two-side illuminating lens body, said light ray is projected by said concave arc toward said concave curved surface, said non-spherical protrusions, and said two laterals to enlarge refracting angle of said light ray to form a butterfly-like light pattern having a large area of high density light.

2. The two-side illuminating lens body, as recited in claim 1, wherein said base is a symmetrical cylinder body about said center light axis, wherein said distribution of light depends on a distance between a highest point of said non-spherical protrusion and said center light axis, and a height difference between said highest point of said non-spherical protrusion to a lowest point of said concave curved surface.

3. The two-side illuminating lens body, as recited in claim 1, wherein said laterals gradually narrows along a projecting direction of said center light axis.

4. The two-side illuminating lens body, as recited in claim 2, wherein said laterals gradually narrows along a projecting direction of said center light axis.

5. The two-side illuminating lens body as claimed in claim 2, wherein an angle between a tangent line of the lateral and the center light axis is about 10 degrees.

6. The two-side illuminating lens body as claimed in claim 3, wherein an angle between a tangent line of the lateral and the center light axis is about 10 degrees.

7. The two-side illuminating lens body as claimed in claim 1, wherein said concave arc is arranged on said center light axis, wherein a diameter of an opening of said concave arc is substantially equal to a distance between two centers on surfaces of said non-spherical protrusions.

8. The two-side illuminating lens body as claimed in claim 3, wherein said concave arc is arranged on said center light axis, wherein a diameter of an opening of said concave arc is substantially equal to a distance between two centers on surfaces of said non-spherical protrusions.

9. The two-side illuminating lens body as claimed in claim 6, wherein said concave arc is arranged on said center light axis, wherein a diameter of an opening of said concave arc is substantially equal to a distance between two centers on surfaces of said non-spherical protrusions.

* * * * *